United States Patent
Kobayashi et al.

(10) Patent No.: US 7,586,277 B2
(45) Date of Patent: Sep. 8, 2009

(54) ELECTRIC POWER STEERING DEVICE

(75) Inventors: Hideyuki Kobayashi, Maebashi (JP); Toru Sakaguchi, Maebashi (JP); Takeshi Hara, Maebashi (JP); Sakae Nejo, Maebashi (JP)

(73) Assignee: NSK Ltd., Tokyo (JP)

( * ) Notice: Subject to any disclaimer, the term of this patent is extended or adjusted under 35 U.S.C. 154(b) by 444 days.

(21) Appl. No.: 10/582,931

(22) PCT Filed: Dec. 3, 2004

(86) PCT No.: PCT/JP2004/018425

§ 371 (c)(1), (2), (4) Date: Jun. 14, 2006

(87) PCT Pub. No.: WO2005/058672

PCT Pub. Date: Jun. 30, 2005

(65) Prior Publication Data

US 2007/0120511 A1 May 31, 2007

(30) Foreign Application Priority Data

Dec. 16, 2003 (JP) ............................... 2003-417689

(51) Int. Cl.
*H02P 7/00* (2006.01)
(52) U.S. Cl. ....................... 318/432; 318/434; 318/599; 318/811
(58) Field of Classification Search .................. 318/432, 318/434, 599, 811
See application file for complete search history.

(56) References Cited

U.S. PATENT DOCUMENTS 4,837,692 A 6/1989 Shimizu ................ 364/424.05
5,404,960 A * 4/1995 Wada et al. ................. 180/446

FOREIGN PATENT DOCUMENTS

EP 0 659 629 A2 6/1995

(Continued)

OTHER PUBLICATIONS

WO 2005/058672 A1, concerning International Application No. PCT/JP2004/018425, cites the following documents in the order they appear in the International Search Report (ISR) (with an English-language translation thereof.

(Continued)

*Primary Examiner*—Rina I Duda
*Assistant Examiner*—Erick Glass
(74) *Attorney, Agent, or Firm*—Sidney Austin LLP

(57) ABSTRACT

An electric power steering device changes the discontinuous non-linear characteristics in the duty ratio of the PWM signal versus motor current generated during steering wheel handle return into linear characteristics to suppress noise and provides a smooth and natural feeling steering. The electric control circuit (13) provided a current reference value calculator (22A) to calculate $I_{ref}$, a current controller (22B) to obtain $V_{ref2}$, a compensation adder (25) to obtain a duty D1, and a current discontinuity compensator (24) in order to obtain a duty D2. A motor drive circuit (35) including an H bridge circuit whose upper stage FET (1) is driven by the duty D1, and whose lower stage FED (3) paired with the upper stage FET (1), is driven by the duty D2 to allow forming a continuous linear characteristic in the duty ratio of the PWM signal versus the motor current.

8 Claims, 9 Drawing Sheets

FOREIGN PATENT DOCUMENTS

| | | |
|---|---|---|
| EP | 0 893 328 A2 | 1/1999 |
| JP | 6-219311 A | 8/1994 |
| JP | 8-67266 A | 3/1996 |
| JP | 8-142884 A | 6/1996 |
| JP | 8-337172 A | 12/1996 |
| JP | 9-30431 A | 2/1997 |
| JP | 9-39810 A | 2/1997 |
| JP | 9-86423 A | 3/1997 |
| JP | 2003-11834 A | 1/2003 |

OTHER PUBLICATIONS

Supplementary European Search Report dated Aug. 14, 2007, for counterpart European Application No. EP 04 82 0539.

* cited by examiner

ELECTRIC POWER STEERING DEVICE

This application is a National Stage of International Application No. PCT/JP2004/018425, filed Dec. 3, 2004, which is based on Japanese Patent Application No. 2003-417689 filed with Japanese Patent Office on Dec. 16, 2003, the entire content of which is incorporated herein by reference.

TECHNICAL FIELD

The present invention relates to an electric power steering device and relates in particular to a control device for that electric power steering device.

BACKGROUND ART

Electric power steering devices for vehicles detect the steering torque and other values generated by the steering shaft from movement of the steering wheel, calculate the current reference value serving as the steering auxiliary instruction for the motor based on that detected signal, and a current feedback control circuit calculates the current control value as the difference between the current reference value and the detected motor current value, and a motor is then driven by the current control value to apply an auxiliary force to the steering wheel.

An electric power steering device of this type utilizes a motor control circuit comprised of four field effect transistors FET 1 through FET 4 connected in a bridge as shown in FIG. 7 to make up an H bridge circuit made up of two arms, a first and a second arm; a voltage V is applied across the input terminals, and a motor M is connected across the output terminals.

Among the two sets of FET pairs comprising the two mutually opposing arms in the H bridge circuit that make up the motor control circuit, the FET 1 of the first arm (or FET 2 of the second arm) is driven by a PWM signal (pulse width modulation signal) at a duty ratio D determined based on the current control value to regulate the flow of the motor current.

The rotation direction of the motor M is controlled by turning FET 3 of the second arm on, and FET 4 of the first arm off (or FET 3 of the second arm off, and FET 4 of the first arm on) based on the current control value signs.

When the FET 3 is conducting current, there is a current flow through the FET 1, the motor M, and the FET 3, and a positive current flows in the motor M. When the FET 4 of the second arm is conducting current, there is a current flow through the FET 2, the motor M, and the FET 4, and a negative current flows in the motor M. This motor control circuit cannot simultaneously drive the FET of both arms so there is little probability of an electrical short and this circuit is widely used since it is highly reliable.

FIG. 8 shows the relation between the motor current I (current actually flowing through the motor, and is different from the detected motor current value) and the duty ratio D of the PWM signal. In other words, in a state where a steering torque is generated by turning the steering wheel, the relation between the motor current I and the duty ratio D changes to that shown by the line (a) in FIG. 8. The current reference value $I_{ref}$ is then calculated based on the steering torque in the control circuit. The motor current control value E which is the difference between the calculated current reference value $I_{ref}$ and the detection value I for the motor current that was fed back, is output to the motor drive circuit so that a duty ratio D is obtained for controlling the semiconductor devices in the motor drive circuit, and no particular problems occur.

However, after turning the steering wheel, the steering wheel then returns to a straight ahead (forward) driving position (hereafter called "steering wheel return") due to self-aligning torque. In this state, no steering torque is generated so the current reference value $I_{ref}$ becomes zero. However a back electromotive force is generated in the motor so that the relation between the motor current I and the duty ratio D shifts upward by an amount equivalent to the back electromotive force as shown by the line (b) in FIG. 8. This upward shift generates a discontinuous section X in the relation between the motor current I and the duty ratio D in the vicinity of the area where the value of duty ratio D is zero.

The feedback control circuit on the other hand, attempts to calculate the current control value E, however there is no duty ratio D corresponding to current reference value $I_{ref}$ so that an oscillating current at an amplitude nearly matching the motor current I of the discontinuous section is output as the current control value E as shown by the line (c) in FIG. 8. This type of oscillating current not only becomes a source of noise but also interferes with feedback control stability.

To resolve this problem, the inventors proposed a method of driving a motor control circuit made up of two pairs of semiconductor devices forming an H bridge circuit of two mutually opposing arms. In this bridge circuit, a first duty ratio PWM signal determined by the current control value drives the semiconductor devices of a first arm; and a second duty ratio PWM signal determined by a function of the first duty ratio, drives the semiconductor devices of a second arm, in a structure where each arm is driven separately. In this structure, there is no discontinuity in the relation between the duty ratio D and the motor current I in the vicinity of the state where the duty ratio D value is zero, even in a state where no steering torque is generated such as steering wheel return where point p is joined to point 0 in a straight line as shown in FIG. 9. Moreover, no oscillating current is output as the current control value E so that no noise is generated and stable feedback control can be attained (See Japanese Laid Open Patent Publication No. H09-39810 (1997-39810)).

In the above structure for driving the semiconductor devices of a first arm with a first duty ratio PWM signal that is determined based on a current control circuit, and driving the semiconductor devices of a second arm with a second duty ratio PWM signal defined by a function of the first duty ratio; separately driving the respective arm eliminates discontinuities in the relation between the duty ratio D and the motor current I, eliminates noise, and improves stability. However as can clearly be understood from FIG. 9, the relation between the motor current I and the duty ratio D is switched in three stages. Eliminating the chattering that accompanies this switching is difficult and problems such as control noise and vibration occur due to this chattering. This invention therefore has the object of resolving the above mentioned problems.

DISCLOSURE OF THE INVENTION

The electric power steering device of this invention for controlling the output of a motor that applies an auxiliary steering force to the steering mechanism from a current reference value calculated based on at least a steering torque generated in the steering shaft, is comprised of a duty ratio calculator for calculating a duty ratio D1 and a duty ratio D2 determined by the motor terminal voltage based on a current reference value, a motor drive circuit including a motor connected across the output terminals and a power supply connected across the input terminals of an H bridge circuit made up of a first arm and a second arm each containing a pair of semiconductor devices connected in series, and PWM signal of duty ratio D1 drives the semiconductor device in the upper stage of the first arm, and PWM signal of duty ratio D2 drives the semiconductor device in the lower stage of the second arm of the H bridge circuit; and a duty ratio calculator for calculating a duty ratio D1 and a duty ratio D2 having a continuous characteristics between the motor current and the duty ratio from the current reference value based on a specified formula.

The duty ratio calculator then separately calculates the duty ratio D1 and a duty ratio D2 based on the motor back electromotive force to have the motor current characteristics for duty ratio D as consecutive linear characteristics.

DESCRIPTION OF THE PREFERRED EMBODIMENT

The basic concept of this invention is described first. This invention further improves the non-linear characteristics between the motor current I and the duty ratio D, namely the non-linear control characteristics made up of the three-stage broken line previously described while referring to FIG. 9, by changing them into continuous linear characteristics.

Figure 7:
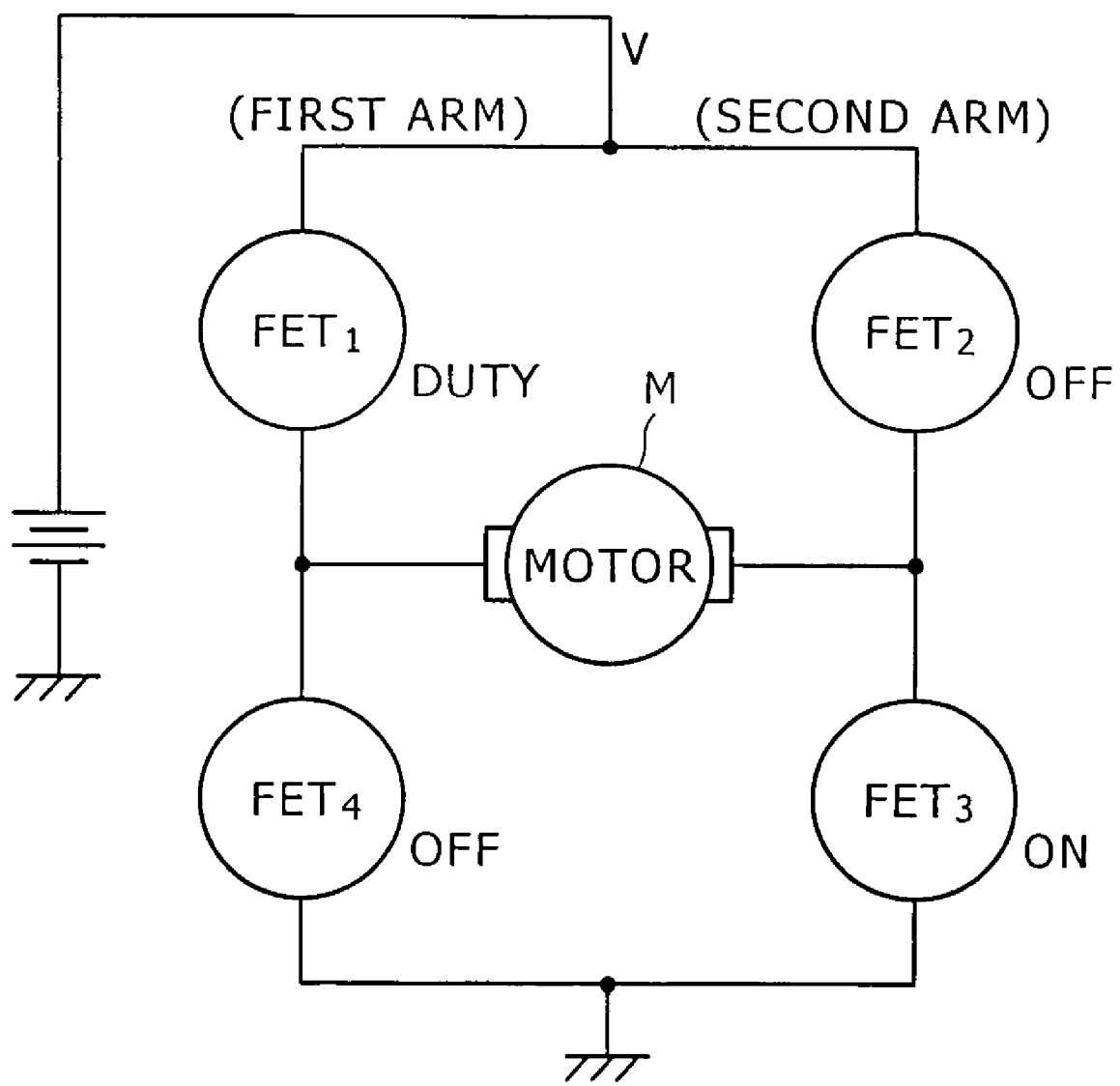
FIG. 7 is a concept diagram for describing the basic structure of the H bridge circuit utilized as the motor drive circuit for the electric power steering device.

The motor control circuit of the electric power steering device is comprised of four field effect transistors FET 1 through FET 4 connected in an H bridge circuit as to make up a bridge made up of two arms, a first and a second arm as previously described in FIG. 7. The FET 1 through FET 4 are driven by PWM signals for a first duty ratio D1 (hereafter called, duty D1) and a second duty ratio D2 (hereafter called duty D2), that is determined based on a current control value E which is the differential between the detected motor current value that was fed back, and the current reference value.

Figure 1:
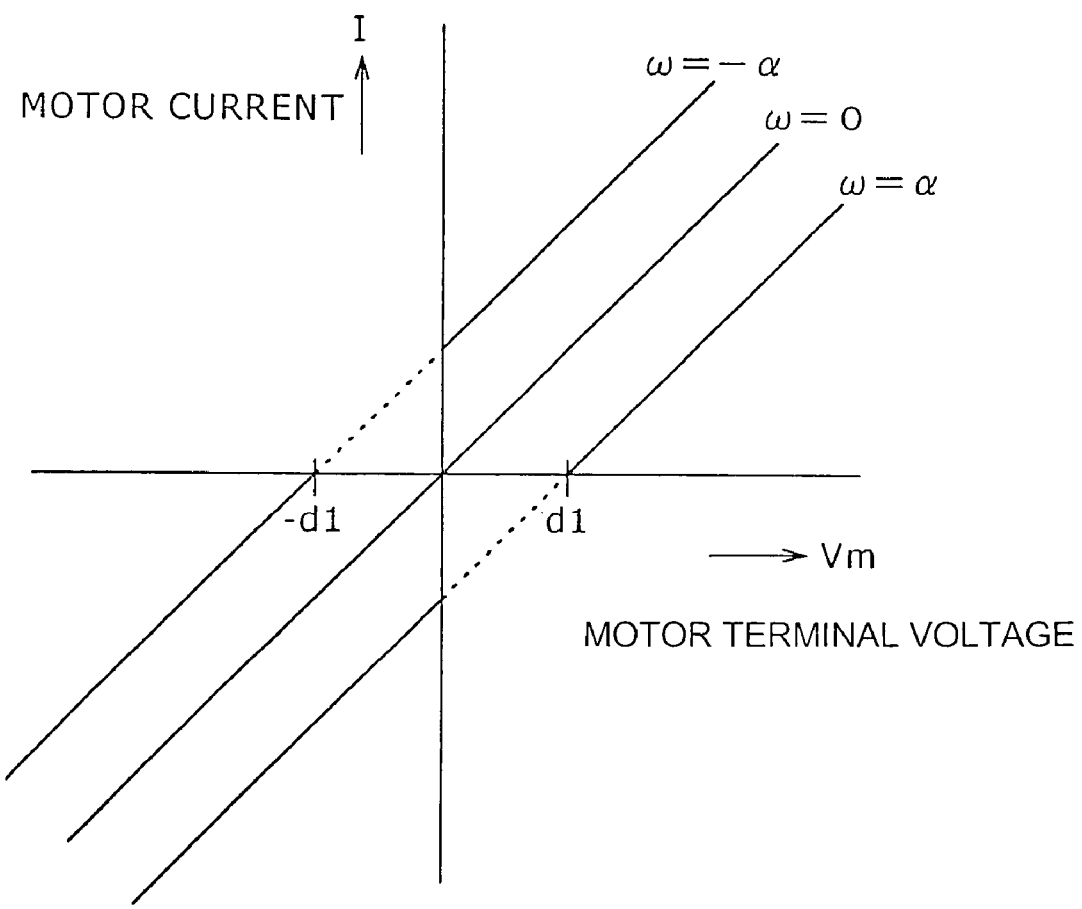
FIG. 1 is a graph showing the relation of motor current I to motor terminal voltage Vm in the H bridge circuit.

FIG. 1 is a drawing showing the relation between the motor terminal voltage Vm and the motor current I in this H bridge circuit, when the FET 1 is driven at duty D1, and the FET 3 is on or in other words, driven at a duty D2 of 100 percent, and the FET 2 and FET 4 are off. If the motor terminal voltage Vm increases from the minus to the plus (positive) side when the motor angular velocity ω, is (ω=α), then the motor current I will suddenly drop to zero (I=0), when the motor terminal voltage Vm is (Vm=0). Also, if the motor terminal voltage Vm decreases from the plus to the minus (negative) side when the motor angular velocity ω, is (ω=−α), then the motor current I will suddenly drop to zero (I=0), when the motor terminal voltage Vm is (Vm=0).

Though previously explained in the voltage Vm (or motor terminal voltage) description, the duty ratio D is a ratio that determines the motor terminal voltage Vm and so the motor terminal voltage can therefore by substituted for the duty ratio. Changing the FET 1 and FET 3 combination to the FET 2 and FET 4 combination reverses the direction that the motor rotates, however there is essentially no change in the operation so the following description uses the FET 1 and FET 3.

In order to improve the non-linear characteristics, this invention is comprised of an H bridge circuit including a first arm and a second arm where an FET 1 is driven at a duty D1, and a FET 3 is driven at a duty D2, with the duty D1 set by the following formula (a), and the duty D2 set by the following formula (b).

$$D1 = V_{ref2}/Vr \quad (a)$$

$$D2 = \{V_{ref2} + \text{sign}(V_{ref2})(Vr - |K_T\omega|)\}/Vr \quad (b)$$

where, $V_{ref2} = \frac{1}{2}(V_{ref}| < |K_T\omega|))$ in the range of $|V_{ref}| < |K_T\omega|$ Here, the respective symbols indicate:

$V_{ref}$: motor terminal voltage command value $V_{ref2}$: linear motor terminal voltage command value Vr: voltage supplied to H bridge (battery voltage)

$K_T$: =constant of back electromotive force of motor

ω: motor angular velocity sign ($V_{ref2}$): sign of linear motor terminal voltage command value $V_{ref2}$ The method for calculating the duty D1 and the duty D2 is described next.

The basic formula for the PWM signal drive in the H bridge circuit is expressed by the following formula (1)

$$Vm = (D1+D2)Vr - \text{sign}(D1)Vr - K_T\omega \quad (1)$$

where, Vm: motor terminal voltage

D1: upper stage duty for driving upper stage FET (value −1 through +1)

D2: lower stage duty for driving lower stage FET (value −1 through +1)

Vr: voltage supplied to H bridge (battery voltage)

$K_T$: constant of back electromotive force of motor

ω: motor angular velocity

Usually, the duty D2 is fixed at 100 percent (D2=1.0), and just the duty D1 is varied. Since the sign for D1 is positive (0.3), when for example 30 percent of the battery voltage (D1=0.3) is applied to the motor, the motor terminal voltage Vm is therefore expressed by the following formula (1).

$$Vm = (0.3+1)Vr - \text{sign}(0.3)Vr - K_T\omega$$

$$= 0.3Vr - K_T\omega$$

However, in order to resolve the problems in the background art as related previously (See Japanese Laid Open Patent Publication No. H09-39810), the duty D2 is calculated according to the following formula (2).

$$D2 = D1 + \text{sign}(D1) \times B \quad (2)$$

where, B is a constant.

Figure 9:
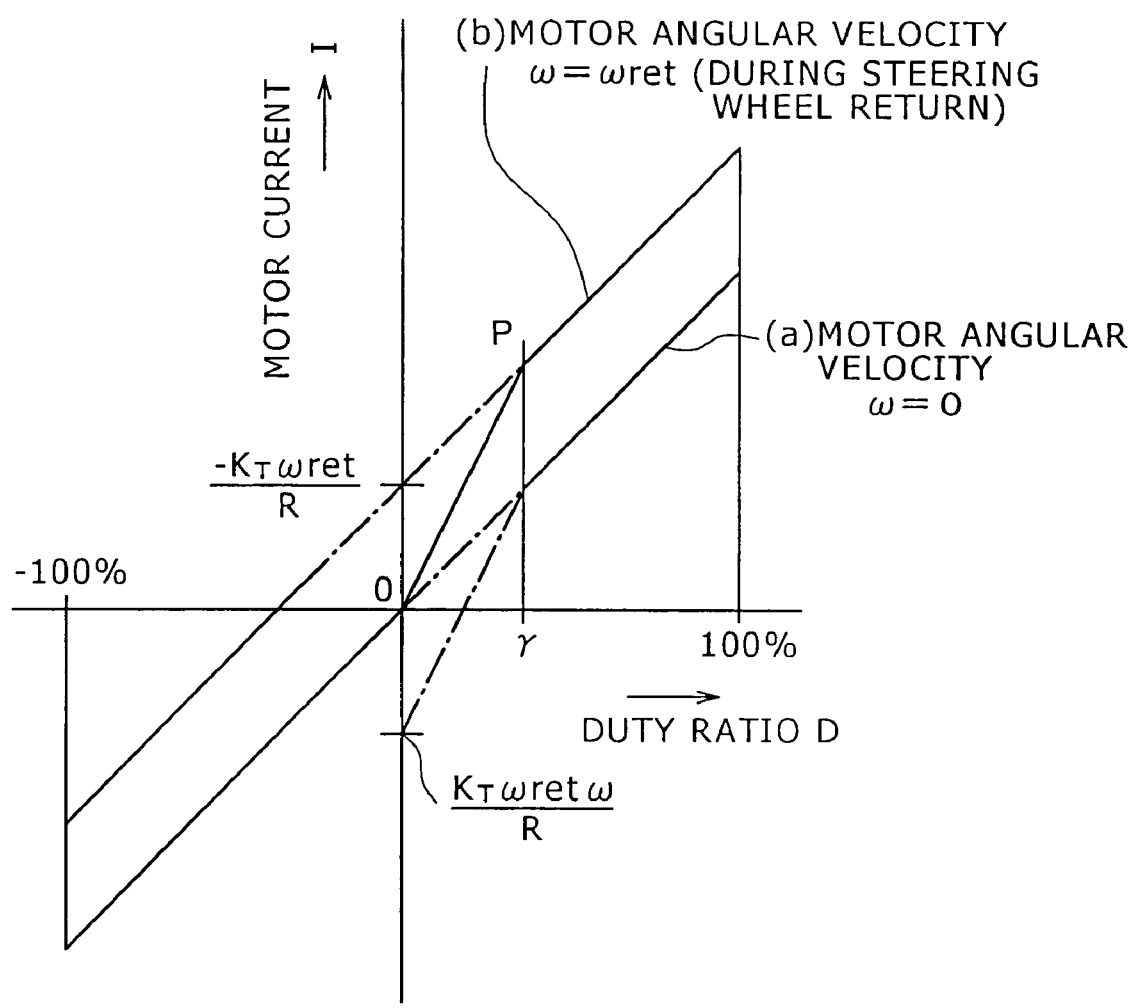
FIG. 9 is a graph for describing the method to eliminate the discontinuous section generated due to the relation of the duty ratio of the PWM signal to the motor current.

The constant B is determined so as to have the relation between the duty D1 and the motor current I so that the characteristics become those as shown in FIG. 9. The internal resistance of the motor can be handled as a fixed value so the characteristics in the graph shown in FIG. 9 can be established even if the motor current I is substituted into the motor terminal voltage Vm.

The determining of the constant B is described next. The formula (1) can be written into the following formula (3), when the condition that the duty D1 and the back electromotive force $K_T\omega$ be different signs is added.

$$Vm=(D1+D2)Vr-\text{sign}(D1)Vr+\text{sign}(D1)|K_T\omega| \quad (3)$$

Figure 8:
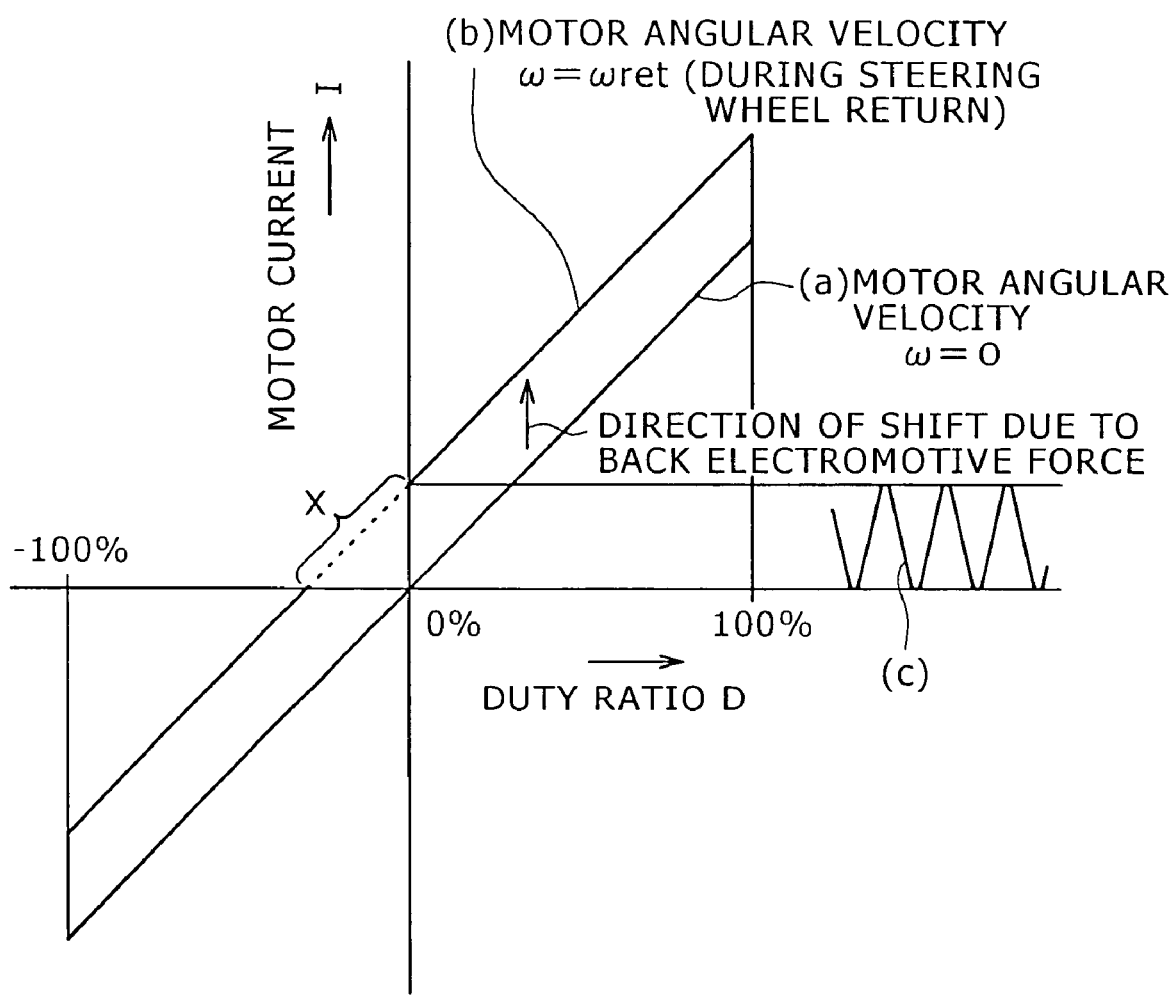
FIG. 8 is a graph for describing the discontinuous section generated due to the relation of the duty ratio of the PWM signal to the motor current.

Formula (3) expresses the characteristics of discontinuous section X shown in FIG. 8. When the condition that the motor terminal voltage Vm is zero (Vm=0) is substituted into formula (3), and the upper stage duty D1 is zero (D1=0), the constant B can be expressed by the following formula (4).

$$0 = (0 + D2)Vr - \text{sign}(0)Vr + \text{sign}(0)|K_T\omega|$$
$$= D2Vr - Vr + |K_T\omega|,$$

and when formula (2) is substituted into this, then $$0 = \{D1 + \text{sign}(D1) \times B\}Vr - Vr + |K_T\omega| \quad (4)$$
$$= BVr - Vr + |K_T\omega|$$
$$B = 1 - \{|K_T\omega|/Vr\}$$

In other words, the constant B is determined by the formula (4), so that the duty D2 expressed in formula (2) becomes a function of the duty D1.

Figure 2:
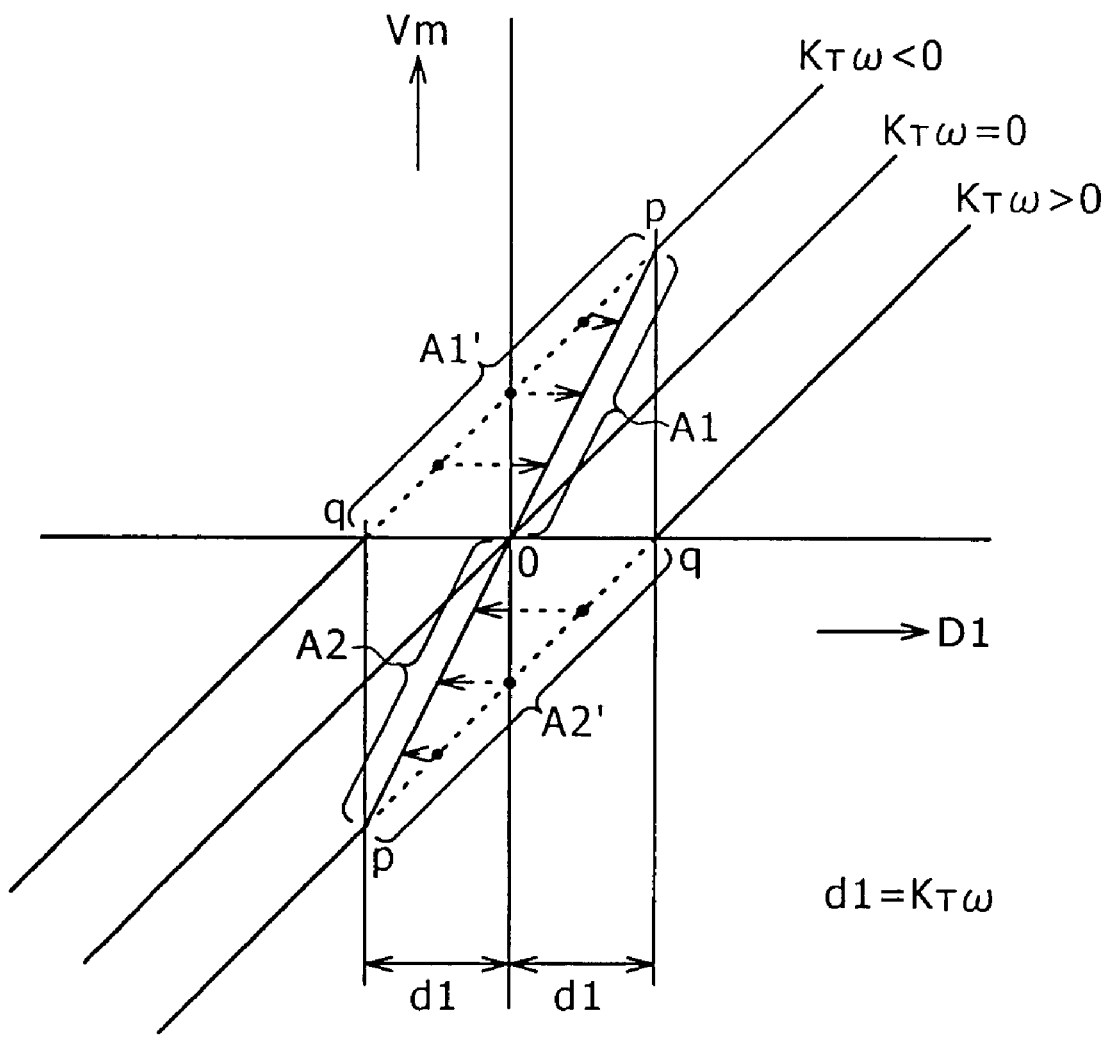
FIG. 2 is a graph showing improving of the discontinuous characteristics of the motor current versus the motor terminal voltage as shown in FIG. 1 to a fully linear waveform.

FIG. 2 is a graph rewritten from the previously described FIG. 9. This figure illustrates improvements of the discontinuous characteristics of discontinuous section X between the motor current I and the motor terminal voltage Vm in FIG. 1. The horizontal axis shows the duty D1 substituted into the motor terminal voltage Vm. FIG. 2 shows the section A1' expressing discontinuous characteristics changed into section A1, and the section A2' changed into section A2, to convert the discontinuous characteristics into continuous characteristics.

The characteristics formula for the section A1' and the section A2', can be expressed as shown below in formula (5) if the duty D1' is utilized in these sections.

$$Vm=VrD1'-K_T\Omega \quad (5)$$

If the duty D1' can be defined by D1, then the discontinuous characteristics can be converted into continuous characteristics. The formula (2), formula (4), formula (5) are substituted into the formula (1). The formula (5) is first of all substituted into the formula (1)

$$Vm=(D1+D2)Vr-\text{sign}(D1)Vr-K_T\omega$$

$$VrD1'-K_T\omega=(D1+D2)Vr-\text{sign}(D1)Vr-K_T\omega$$

$$VrD1'=(D1+D2)Vr-\text{sign}(D1)Vr$$

When formula (2) is substituted into D2 of this formula, then:

$$VrD1'=(D1+(D1+\text{sign}(D1)\times B)Vr-\text{sign}(D1)Vr$$

$$D1'=2D1+\text{sign}(D1)(B-1)$$

Solving for D1 in this formula yields:

$$D1=\tfrac{1}{2}\{D1'-\text{sign}(D1)(B-1)\}$$

Substituting formula (4) into B of this formula yields:

$$D1=\tfrac{1}{2}\{D1'-\text{sign}(D1)\{|K_T\omega|/Vr\}\}$$

Adding the condition that the upper stage duty D1 and $K_T\omega$ are different signs yields:

$$D1=\tfrac{1}{2}\{D1'-(K_T\omega/Vr)\} \quad (6)$$

Eliminating the sign D1 from the right part of formula (6), allows removing the absolute value so that the duty D1 can define the duty D1'.

Figure 3:
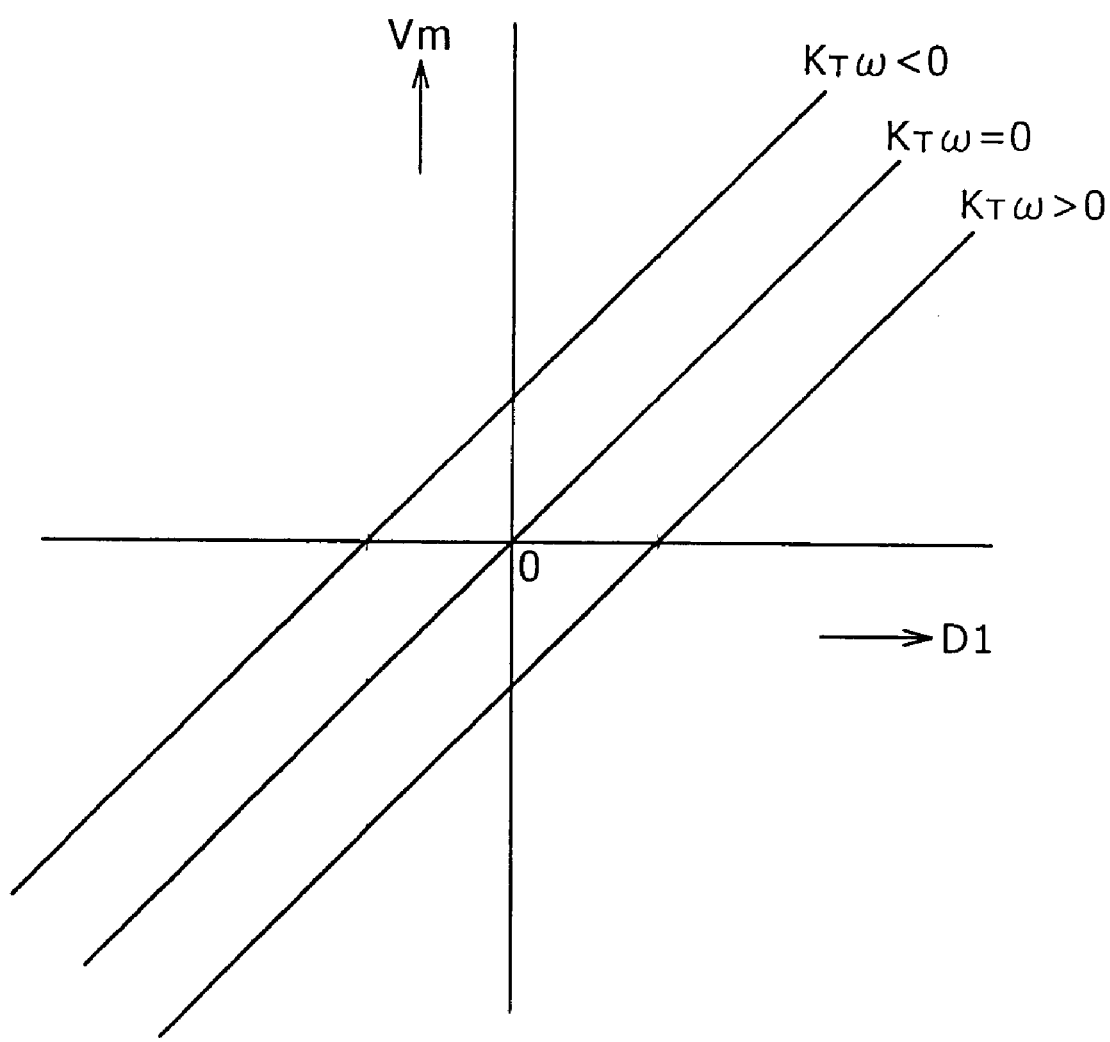
FIG. 3 is a graph showing the improvement of continuous characteristics of the Duty ratio versus motor terminal voltage as shown in FIG. 2, to a fully linear waveform.

In the above explanation, the discontinuous characteristics between motor terminal voltage Vm and motor current I of section A1' and section A2' in FIG. 2 were described as being changed to the respective continuous characteristics of section A1 and A2. The characteristics between the motor terminal voltage Vm and Duty D1 in FIG. 2 were continuous characteristics along the three stages p-0-q on the bent line. These continuous characteristics along the bent line of the three stages p-0-q are therefore converted to the completely linear continuous characteristics p-q as shown in FIG. 3.

In the embodiment, the motor terminal voltage command value $V_{ref}$ is calculated from the difference between the detected motor current I and the current reference value $I_{ref}$ that regulates the motor current, and used to regulate the motor terminal voltage. The duty ratio value is calculated as a voltage command so that in the following explanation it is referred to as motor terminal voltage command value $V_{ref}$.

The motor terminal voltage command value $V_{ref}$ is mapped according to formula (6), by the second voltage command value that functions as the linear motor terminal voltage command value $V_{ref2}$. Here, the term "mapping" signifies that the motor terminal voltage command value $V_{ref}$ is converted to the linear motor terminal voltage command value $V_{ref2}$ in order to convert the continuous bent line of three stages p-0-q, into the completely linear continuous characteristic p-q as shown in FIG. 3.

In the mapping process, the duty D1 is made to equal $V_{ref2}/Vr$, and the duty D1' is made to equal $V_{ref}/Vr$, and the line A1 is converted to A1', and line A2 is converted to A2' as shown in FIG. 2. This conversion is in the range $|V_{ref}|<|K_T\omega|$ of non-linear characteristics equivalent to the range p-q in FIG. 2.

Substituting D1=$V_{ref2}/Vr$, D1'=$V_{ref}/Vr$ into formula (6), allows expressing formula (6) as the following formula (7), and mapping can be performed with the following formula (7).

$$V_{ref2}/Vr=\tfrac{1}{2}\{(V_{ref}/Vr)-(K_T\omega/Vr)\}$$

$$V_{ref2}=\tfrac{1}{2}(V_{ref}-K_T\omega) \quad (7)$$

Calculating the duty D1 is described next. In the mapping process, the duty D1 is handled as D1=$V_{ref2}/Vr$, and $V_{ref2}$ is expressed with the above formula (7), so that the duty D1 can be expressed with the following formula (a).

$$D1 = \{1/2(V_{ref} - K_T\omega)\}/Vr \quad (a)$$
$$= V_{ref2}/Vr$$

In the actual control circuit described later on, the duty D1 expressed in formula (a) is compensated such as by dead time compensation (or offset), and duty dither adding. Whether to perform this processing or not can be selected by optional selection items. The duty D1 set in formula (a) does not contain results from compensation processing such as dead time compensation (or offset), and duty dither adding.

Calculating the duty D2 is described next. When the formula (4) and formula (7) are substituted into formula (2), the duty D2 shown next can be expressed in the following formula (b).

$$D2 = D1 + \text{sign}(D1) \times B \quad (2)$$

$$= (V_{ref2}/Vr) + \text{sign}(V_{ref2}/Vr) \times \{1 - (|K_T\omega|/Vr)\} \quad (b)$$

$$= V_{ref2} + \text{sign}(V_{ref2})(Vr - |K_T\omega|)\}/Vr$$

In other words, the duty D2 can be expressed without duty D1 as expressed in formula (a). This fact signifies that the duty D2 is set separately from the duty D1.

In the characteristics graph in FIG. 2, the mapping is performed in the range p-q, and the following condition (c) must be satisfied between the absolute value $V_{ref}$ for the motor terminal voltage command value and the absolute value $K_T\omega$ of the back electromotive force of the motor $$|V_{ref}| < |K_T\omega| \quad (c)$$

If this condition (c) is satisfied, then the duty D1 is calculated by the formula (a), and the duty D2 is calculated by the formula (b). If this condition is not satisfied, then the duty D1 and duty D2 are calculated by the usual method without mapping.

However, in the vicinity the condition boundary or in other words, near point q in FIG. 2, the values for duty D1, D2 needed for mapping will differ greatly depending on whether this condition was satisfied or not. In other words, if the condition is satisfied then mapping is performed from point o to point q, and conversion to the completely linear characteristics p-q in FIG. 3 is performed. However if the condition is not satisfied, then D1 and D2 are calculated by the usual method without mapping. In this case, the characteristics in the graph shown in FIG. 2, are the same as the three-stage bent line continuous characteristics p-0-q.

If the motor terminal voltage command value $V_{ref}$ and the back electromotive force $K_T\omega$ of motor contain noise, then the conditions might or might not be satisfied (established/not established) in the vicinity of the condition boundary (near point q in FIG. 2), the mapping frequently switches between an executable or non-executable state, so that the duty values D1 and D2 frequently fluctuate, chattering occurs, and noise and vibration are generated.

A decision is made in the above mapping process, on whether the condition is established or not established, after filtering out the noise components in the motor terminal voltage command value $V_{ref}$ and the motor back electromotive force $K_T\omega$.

In other words, when the following condition (d)

$$|V_{ref}| < |K_T\omega| \quad (d)$$

is satisfied among the absolute value for motor terminal voltage command value $V_{ref}$ and the back electromotive force $K_T\omega$ of the motor after filtering their respective noise components, then the duty D1 for performing mapping can be calculated from formula (a), and the duty D2 can be calculated from formula (b). If this condition is not satisfied then the duties D1 and D2 are calculated by the usual method without mapping.

The hysteresis characteristic may be applied to the above condition in order to prevent chattering from occurring in the mapping process.

In order to prevent chattering in the vicinity of the hysteresis characteristic boundary value, the prior decision results can be held (for use) regardless of whether the prior conditions were established or not.

Namely, when the following condition (f)

$$(|V_{ref}| - |K_T\omega|) < -Hys \quad (f)$$

where, Hys: the value of hysteresis width characteristics.

is satisfied for the absolute value for the motor terminal voltage command value $V_{ref}$ and the absolute value for the back electromotive force $K_T\omega$ of motor with their noise components filtering out, then the duty D1 needed for mapping can be calculated from formula (a), and the duty D2 may be calculated from the formula (b).

If the condition (f){$(|V_{ref}| - |K_T\omega|) < -Hys$} is not satisfied at this time, then D1 and D2 are calculated by the usual method without mapping.

In addition, the condition (g) is satisfied, then the decision results from the prior condition (condition (f) was established or not) may be maintained without mapping.

$$-hys < (|V_{ref}| - |K_T\omega|) < Hys \quad (g)$$

The value of hysteresis characteristic Hys may be set as needed such as experimentally, according to the level of the noise contained in the motor terminal voltage command value $V_{ref}$ and the back electromotive force $K_T\omega$ of motor.

Figure 4:
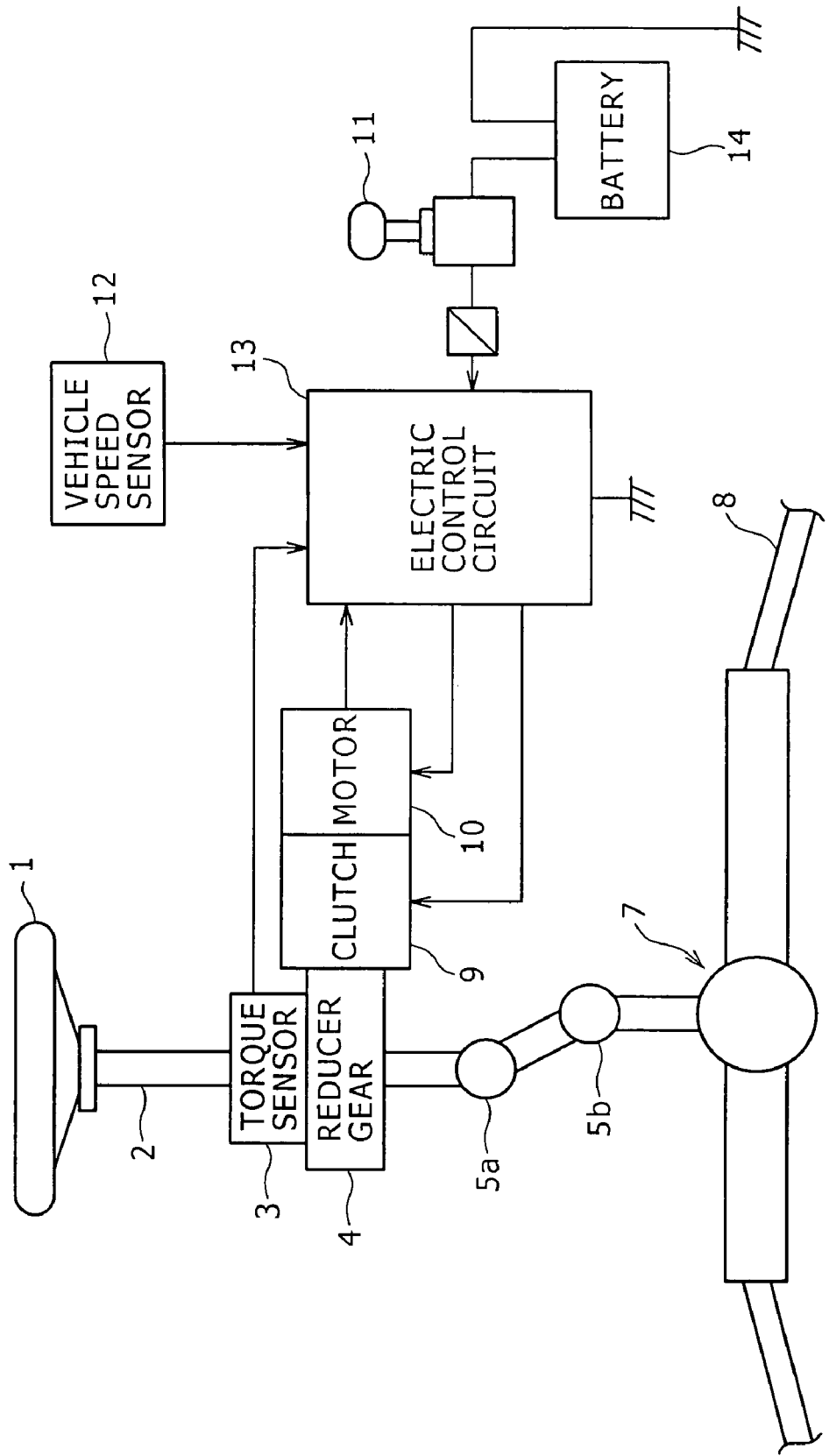
FIG. 4 is a drawing showing an overall view of the structure of the electric power steering device.

The outlines of the electric power steering device of this invention is described next while referring to FIG. 4 through FIG. 6. FIG. 4 is a drawing showing overall view of the structure of the electric power steering device. In this figure, a shaft 2 of a steering wheel 1 is coupled to a tie rod 8 via a speed reducer gear 4, a universal joint 5a, 5b, and pinion rack mechanics 7. A torque sensor 3 for detecting the steering torque of the steering wheel 1 is installed on the shaft 2. A motor 10 to apply an auxiliary steering force is coupled to the shaft 2 via a speed reducer gear 4 and a clutch 9.

Electrical power is supplied from a battery 14 via the ignition key 11 to an electric control circuit 13 for controlling the power steering device. The electric control circuit 13 calculates the current reference value based on the vehicle speed detected by a vehicle speed sensor 12 and the steering torque detected by a torque sensor 3; and controls the electrical current supplied to the motor 10 based on the current reference value that was calculated.

The electric control circuit 13 controls a clutch 9. The clutch 9 is engaged during normal operation, and is disengaged when the electric control circuit 13 decides there is a failure in the electric power steering device and the power is off.

Figure 5:
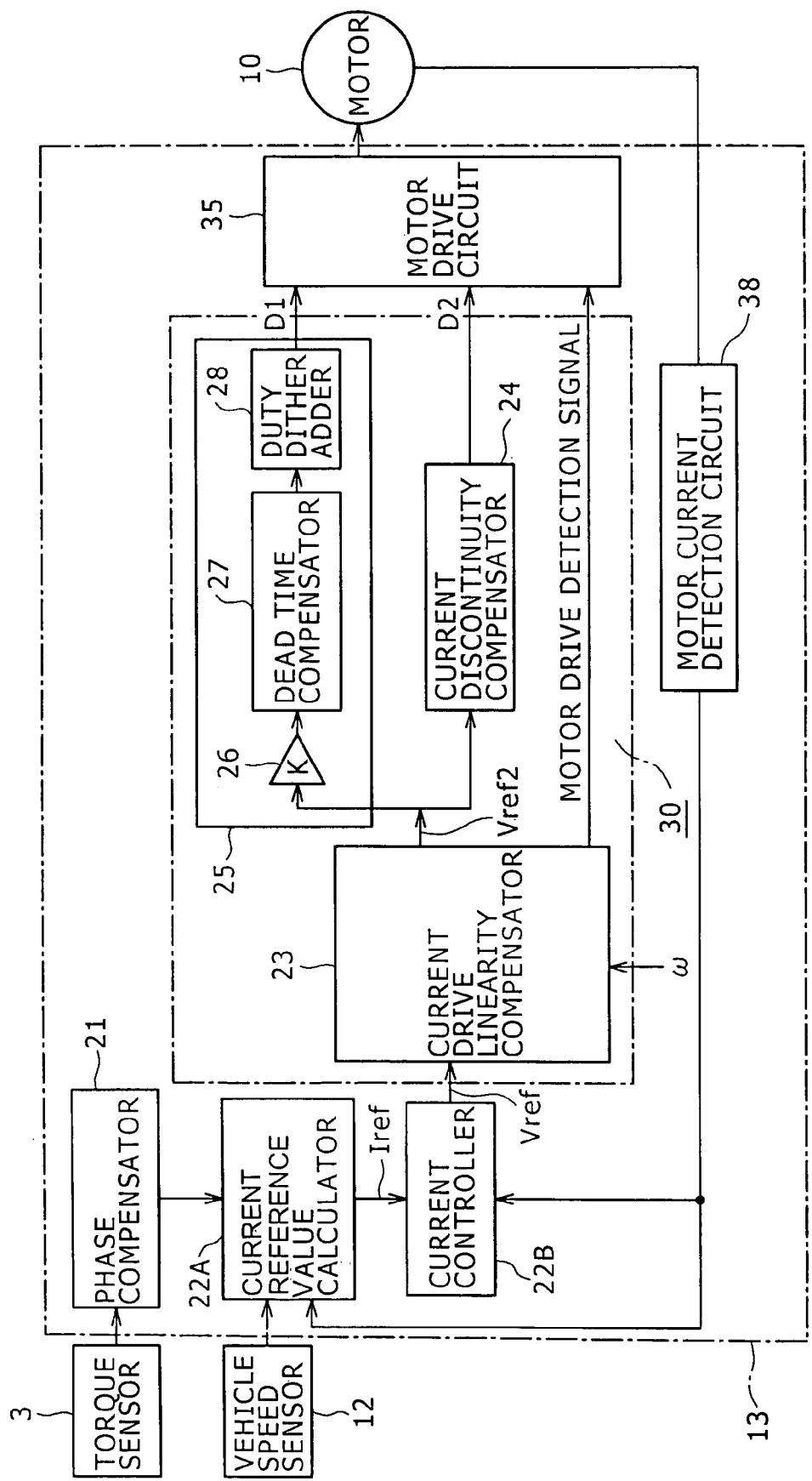
FIG. 5 is a block diagram of the electronic control circuit.

FIG. 5 is a block diagram of the electric control circuit 13. In the present examples the electric control circuit 13 consists of mainly a CPU. The functions described here are executed by programs within that CPU. A phase compensator 21 for example, indicates that phase compensation function performed in a CPU and does not indicate a phase compensator 21 made up of separate hardware.

The function and operation of the electric control circuit 13 are described next. The steering torque signal input from the torque sensor 3 is phase-compensated by the phase compensator 21 in order to increase the stability of the steering system, and is inputted to a current reference value calculator 22A. The vehicle speed signal detected by the vehicle speed sensor 12 is also inputted to the current reference value calculator 22A.

The current reference value calculator 22A calculates the current reference value (current command value) $I_{ref}$ by using the specified calculation formula based on the detected motor current value I, and the vehicle speed signal, and steering torque signal that were inputted. A current controller 22B calculates the motor terminal voltage command value $V_{ref}$ based on the detected motor current value I, and the current reference value $I_{ref}$ that were inputted.

A duty ratio processor 30 that functions as the duty ratio calculation means, contains a current drive linearity compensator 23, a current discontinuity compensator 24, and a compensator adder 25. The compensator adder 25 includes a multiplier 26, a dead time compensator 27, and a duty dither adder 28, and functions of duty ratio processor 30 is a calculating and outputting means for the duty D1, duty D2, and the motor drive directional signals.

The current drive linearity compensator 23 inputs the motor terminal voltage command value $V_{ref}$, the battery voltage Vr, and the motor angular velocity ω (detected with a motor angular velocity sensor not shown in the drawing, or estimated from the motor terminal voltage and motor current), and calculates the linear motor terminal voltage command value $V_{ref2}$ based on formulas (6) and (7). The calculated value $V_{ref2}$ is inputted to the current discontinuity compensator 24 and the compensator adder 25.

The compensator adder 25 calculates the duty D1 based on the formula (a), so that the linear motor terminal voltage command value $V_{ref2}$ is multiplied by a specified gain K in the multiplier 26, compensation processing such as dead time compensation and duty dither adding is performed in the dead time compensator 27 and the duty dither adder 28, and the compensated duty D1 is then calculated.

The current discontinuity compensator 24 calculates the duty D2 based on formula (b) so that the duty D2 is calculated from the linear motor terminal command voltage $V_{ref2}$.

The duty D1 and the duty D2 that were calculated are inputted along with the motor drive direction signal output from the current drive linearity compensator 23, into the motor drive circuit 35.

Figure 6:
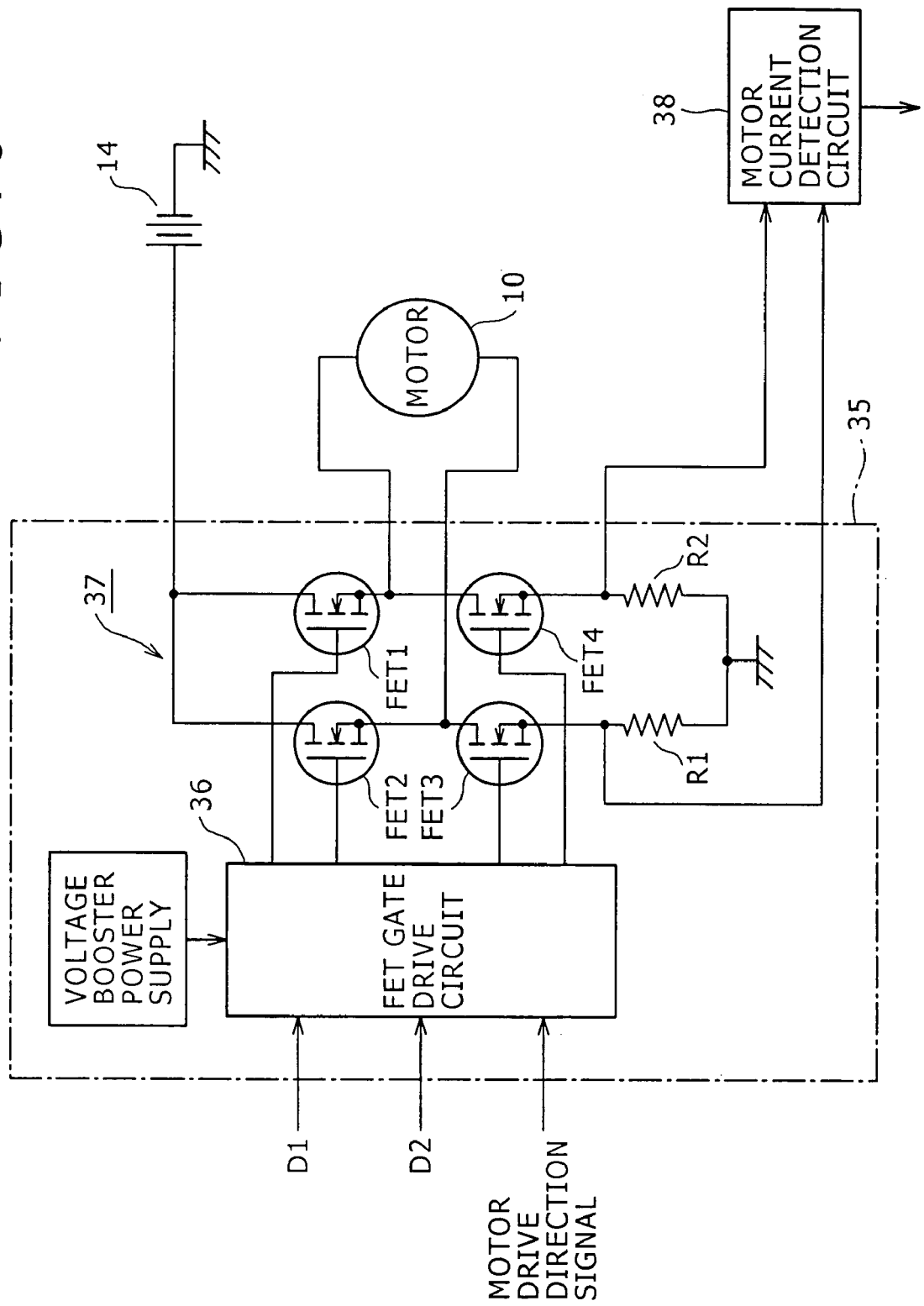
FIG. 6 is a diagram showing one example of the structure of the motor drive circuit.

FIG. 6 shows an example of the structure of motor drive circuit. The motor drive circuit 35 includes a FET gate drive circuit 36, and an H bridge circuit 37 made up of the FET 1 through FET 4, and drives the FET 1 through FET 4 based on the upper stage duty D1 and lower stage duty D2, as well as the motor drive directional signal that were inputted.

A motor current detection circuit 38 detects the flow of current in a positive direction based on the voltage drop across both ends of a resistor R1, and also detects the flow of current in a negative direction based on the voltage drop across both ends of the resistor R2. The motor current detection circuit 38 feeds back the detected motor current value I to the current reference value calculator 22A and the current controller 22B.

The dead time compensation and duty dither add processing is described next. The dead time compensation is described first. A dead time is established at the point in time that the PWM signal switches, in order to prevent electrical shorts due to the two arms in the H bridge circuit conducting simultaneously at the point in time that the signal switches from H to L, or at the point in time that the signal switches from L to H, based on the duty D of the PWM signal in the motor drive circuit utilized in the H bridge circuit. Dead time compensation is not the main subject of this application, so a description is omitted here. A description is however given in Japanese Laid Open Patent Publication No. H08-142884 by the present inventors.

The duty dither add processing is described next. A dead band occurs in the characteristics between motor current I and duty ratio D, in the vicinity where the duty D of the PWM signal is zero in the motor drive circuit utilized in the H bridge circuit. This dead band causes poor control response, and the steering feeling is not natural. A voltage dither signal is therefore supplied to the motor in the vicinity of the dead band to improve the control response, and makes more natural steering feeling. Duty dither adding is not the main subject of this application, so a description is omitted here. A description is however given in Japanese Laid Open Patent Publication No. 2003-11834 by the present inventors.

This invention as described above, the characteristics between motor current I and duty ratio D exhibit continuous linear characteristics near the duty ratio D of zero. This invention therefore not only eliminate discontinuous sections in the characteristics between motor current I and duty ratio D near the duty ratio D of zero, that occur in a conventional electric power steering device, but can also eliminate step-type continuous characteristics. Therefore the change in feedback characteristics are eliminated even during the "steering wheel return" after the steering wheel was turned and then returned for driving straight ahead, so that an extremely smooth driving feeling is obtained.

Moreover, there is no chattering since no step-type changes occur from continuous changes in the back electromotive force generated in the motor during steering wheel return, and no noise due to chattering so that no noise is generated in car radios and other remarkable effects not seen in a conventional electric Power steering device.

INDUSTRIAL APPLICABILITY

This invention relates to an electric power steering device for vehicles, and by correcting discontinuous characteristics between motor current and duty ratio D that occur in the vicinity of zero in the duty D of the PWM signal driving the semiconductor devices within a motor drive circuit semiconductor devices connected in an H bridge circuit, this invention can improve the control response, and provide a more natural steering feeling.

What is claimed is:

1. An electric power steering device for controlling the output of a motor that applies an auxiliary steering force to a steering mechanism from a current reference value calculated based on at least a steering torque signal generated in a steering shaft, said device comprising:
   a duty ratio calculator for calculating a duty ratio D1 and a duty ratio D2 determined by a motor terminal voltage based on said current reference value; and
   a motor drive circuit including a motor connected across the output terminals and a power supply connected across the input terminals of an H bridge circuit made up of a first arm and a second arm each containing a pair of semiconductor devices connected in series, a PWM signal for a duty ratio D1 driving said semiconductor device in the upper stage of said first arm, and a PWM signal for a duty ratio D2 driving said semiconductor device in the lower stage of said second arm of said H bridge circuit,
   wherein said duty ratio calculator calculates said duty ratio D1 and said duty ratio D2 having a continuous characteristics between the motor current and a duty ratio D from said current reference value based on a specified calculation formula.

2. An electric power steering device according to claim 1, wherein said duty ratio calculator calculates said duty ratio D1 and said duty ratio D2 separately based on the back electromotive force of said motor to have a continuous characteristics between the motor current and the duty ratio D.

3. An electric power steering device for controlling the output of a motor that applies an auxiliary steering force to a steering mechanism from a current reference value calculated based on at least a steering torque signal generated in a steering shaft, said device comprising:
   a duty ratio calculator for calculating a duty ratio D1 and a duty ratio D2 determined by a motor terminal voltage based on said current reference value; and
   a motor drive circuit including a motor connected across the output terminals and a power supply connected across the input terminals of an H bridge circuit made up of a first arm and a second arm each containing a pair of semiconductor devices connected in series, a PWM signal for duty ratio D1 driving said semiconductor device in the upper stage of said first arm, and a PWM signal for a duty ratio D2 driving said semiconductor device in the lower stage of said second arm of said H bridge circuit,
   wherein, when the following condition (c) is satisfied for the absolute voltage of the motor terminal voltage command value $V_{ref}$ and the absolute value of the motor back electromotive force $K_T\omega$:

$$|V_{ref}|<|K_T\omega| \tag{c}$$

then said duty ratio calculator calculates said duty ratio D1 from the following formula (a), and said duty ratio D2 from the following formula (b):

$$D1=V_{ref2}/Vr \tag{a}$$

$$D2=\{V_{ref2}+\mathrm{sign}(V_{ref2})(Vr-|K_T\omega|)\}/Vr \tag{b}$$

Here, $V_{ref}$: motor terminal voltage command value
$V_{ref2}$: linear motor terminal voltage command value
=½ $(V_{ref}-K_T\omega)$
Vr: Voltage supplied to H bridge (battery voltage)
$K_T$: =Motor back electromotive force constant
$\omega$: Motor angular velocity
sign($V_{ref2}$): reference symbol for linear motor terminal voltage command value $V_{ref2}$.

4. An electric power steering device according to claim 3, wherein the following condition $$|V_{ref}|<|K_T\omega| \tag{d}$$

is satisfied for the absolute value of said motor terminal voltage command value $V_{ref}$ and the absolute value of said motor back electromotive force $K_T\omega$ after filtering out their respective noise components, then said duty ratio calculator can calculate said duty ratio D1 from said formula (a), and said duty ratio D2 from said formula (b).

5. An electric power steering device according to claim 3, wherein following condition $$(|V_{ref}|-|K_T\omega|)<-Hys \tag{f}$$

(Hys: Hysteresis Width Characteristics Value)
is satisfied for the absolute value of said motor terminal voltage command value $V_{ref}$ and absolute value of said motor back electromotive force $K_T\omega$, then said duty ratio calculator can calculate said duty ratio D1 from formula (a), and said duty ratio D2 from formula (b); and the previous decision results can be maintained when the following condition $$-Hys<(|V_{ref}|-|K_T\omega|)<Hys \tag{g}$$

is satisfied.

6. An electric power steering device according to claim 5, wherein noise components are filtering filtered out from at least either one of said motor terminal voltage command value $V_{ref}$ or said motor back electromotive force $K_T\omega$.

7. An electric power steering device according to claim 5, wherein said hysteresis width characteristic value Hys is determined according to the level of the noise.

8. An electric power steering device according to any of claim 3 through claim 6, wherein said duty ratio calculator includes a current drive linearity compensator and a current discontinuity compensator, and said current drive linearity compensator calculates said duty ratio D1 for said linear motor terminal voltage command value $V_{ref2}$ from the input of said motor terminal voltage command value $V_{ref}$ based on said formula (a); and said current discontinuity compensator calculates said duty ratio D2 from the input of said linear motor terminal voltage command value $V_{ref2}$ based on said formula (b).

* * * * *

UNITED STATES PATENT AND TRADEMARK OFFICE
CERTIFICATE OF CORRECTION

PATENT NO. : 7,586,277 B2 Page 1 of 1
APPLICATION NO. : 10/582931
DATED : September 8, 2009
INVENTOR(S) : Hideyuki Kobayashi et al.

It is certified that error appears in the above-identified patent and that said Letters Patent is hereby corrected as shown below:

Column 12:
Line 23 Claim 6, delete "are filtering filtered out" and insert -- are filtered out --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,586,277 B2 Page 1 of 1
APPLICATION NO. : 10/582931
DATED : September 8, 2009
INVENTOR(S) : Kobayashi et al.

It is certified that error appears in the above-identified patent and that said Letters Patent is hereby corrected as shown below:

On the Title page,

[*] Notice:   Subject to any disclaimer, the term of this patent is extended or adjusted under 35 U.S.C. 154(b) by 444 days.

Delete the phrase "by 444 days" and insert -- by 578 days --

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,586,277 B2 Page 1 of 1
APPLICATION NO. : 10/582931
DATED : September 8, 2009
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Fourteenth Day of September, 2010

David J. Kappos
*Director of the United States Patent and Trademark Office*